J. R. WARREN.
SPRING WHEEL.
APPLICATION FILED APR. 18, 1917.

1,298,269.

Patented Mar. 25, 1919.

WITNESSES
Arthur R. Moore
Wm H. Mulligan

INVENTOR
John R. Warren
BY Richard B. Owen,
ATTORNEY

UNITED STATES PATENT OFFICE.

JOHN R. WARREN, OF COMMERCE, OKLAHOMA, ASSIGNOR OF ONE-HALF TO WALTER L. McCRACKEN, OF COMMERCE, OKLAHOMA.

SPRING-WHEEL.

1,298,269.  Specification of Letters Patent.  Patented Mar. 25, 1919.

Application filed April 18, 1917. Serial No. 162,991.

*To all whom it may concern:*

Be it known that I, JOHN R. WARREN, a citizen of the United States, residing at Commerce, in the county of Ottawa and State of Oklahoma, have invented certain new and useful Improvements in Spring-Wheels, of which the following is a specification.

This invention has relation to spring wheels and more particularly to a wheel having a plurality of coil springs disposed and acting in a similar manner to that of the ordinary wheel spokes.

The primary object of the invention is to provide a hub and a wheel rim connected together by a series of properly arranged tension springs constructed to suspend the load from the springs at the uppermost portion of the wheel during the rotation of the latter.

Another object of the invention is the provision of angularly disposed springs associated with radially parallel springs whereby end thrust on the wheel will be compensated for, and give strength to the wheel.

Another object of the invention is to provide a spring wheel of this character eliminating the use of bolts, screws and the like in the connection established between the springs and the wheel, the same being constructed to be easily detached and attached when desired.

A further object of this invention is the provision of a spring wheel which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which.

Figure 1:
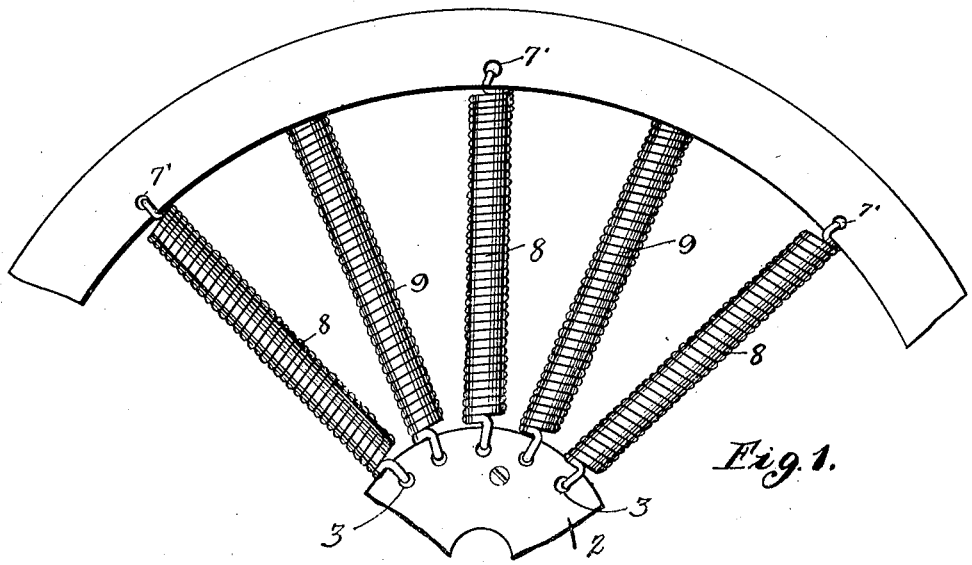
Figure 1 is a fragmentary side elevation of a portion of a wheel constructed in accordance with my invention.

Referring to the drawing, wherein is illustrated the preferred form of my invention, and in which like numerals of reference indicate corresponding parts throughout the several views, the hub 1 is provided on each end with the flanges 2 and the latter are provided with a series of circumferentially spaced apertures 3, shown in detail in Fig. 1. A wide and a narrow rim section, each of channel like formation, are bolted together, thus providing the relatively wide traction portion 4 of the rim, and the relatively narrow inner portion 5 of the rim. Each marginal edge of the traction portion 4 is provided with a flange 6, and the marginal edge of each flange is provided with a plurality of circumferentially spaced openings 7'. The inner rim portion 5 consists of a circular ring securely attached to the inner periphery of the traction portion 4, and this also has the marginal flanges 7 which are equal in width and diameter to the flange 6. These flanges 7 also have circumferentially spaced openings, but it is to be observed that the openings in the flanges 6 and in the flanges 7 are not transversely alined, but the same are alternately spaced in staggered relation around the flanges.

Figure 2:
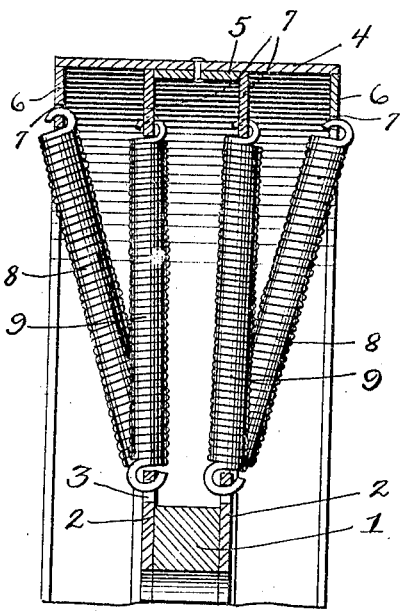
Fig. 2 is a transverse radial section.

A plurality of tension springs 8 and 9 are provided at each end with hooks. The inner ends of the springs are attached to the flanges 2 by inserting the corresponding hooks through the openings 3. The opposite ends of the tension springs 8 have their hooks engaged in the openings 7' formed in the flanges 6 and, therefore, these springs 8, while extending radially, are also disposed at an angle to the plane of the wheel, as shown by Fig. 2 of the drawing. The springs 9, however, are attached to the openings in the flanges 7, and it is to be noted that the flanges 7 are spaced apart for a distance equal to the distance between the flanges 2 on the hub. When the hooks on the springs 9 are caught in their respective positions, the springs will be disposed perfectly radially.

It is to be observed that the coiled tension springs 8 and 9 have their coils in close juxtaposition. Therefore, no compression of the spring can occur. Of course, any desired number of springs may be arranged between the rim and the hub according to the duty of the wheel and to the weight of the vehicle which is to be supported by the wheels. When the wheel is mounted upon an axle, the springs above the center of the axle will sustain the load and the same will be resiliently suspended from the upper half of the wheel rim and as the wheel rotates, the load will constantly change as the springs move into the position for suspending the load.

From the foregoing it will be observed that a very simple and durable spring wheel has been provided, the details of which embody the preferred form. I desire it to be understood, however, that slight changes in the minor details of construction may be made without departing from the spirit of the invention or the scope of the claim hereunto appended.

I claim:

In an automobile wheel, a relatively short hub, having an annular flange mounted at each end thereof, a wide and a narrow rim section secured together whereby the said narrow section is centrally located with respect to the said wide rim section, each of channel like formation for providing annular flanges laterally spaced apart and of substantially the same diameter, the outermost flanges being spaced for a distance considerably greater than the distance between the flanges of the said hub, the latter being spaced for a distance substantially equal to the distance between the innermost flanges on the rim; in combination with resilient means comprising a plurality of coil springs connected to the said flanges on the hub and to the said flanges on the rim sections.

In testimony whereof I affix my signature in presence of two witnesses.

JOHN R. WARREN.

Witnesses:
A. A. THOMAS,
H. J. BUTCHER.

Copies of this patent may be obtained for five cents each, by addressing the "Commissioner of Patents, Washington, D. C."